United States Patent [19]

Dempsey

[11] 4,290,882
[45] Sep. 22, 1981

[54] ELECTROSTATIC SEPARATION OF IMPURITIES PHASE FROM LIQUID-LIQUID EXTRACTION

[75] Inventor: John P. Dempsey, Lakeland, Fla.

[73] Assignee: Davy Powergas Inc., Lakeland, Fla.

[21] Appl. No.: 971,748

[22] Filed: Dec. 21, 1978

[51] Int. Cl.³ .............................................. B01D 11/04
[52] U.S. Cl. .................................. 210/634; 210/748;
204/190; 423/8; 423/10
[58] Field of Search .................. 210/21, 22, 65, 73 R,
210/73 W, 83; 423/8, 10, 24, 658.5; 204/185,
190; 75/101 R; 422/256; 196/14.52

[56] References Cited

U.S. PATENT DOCUMENTS

| | | | |
|---|---|---|---|
| 2,050,301 | 8/1936 | Fisher | 204/185 |
| 2,417,637 | 3/1947 | Eddy | 204/190 |
| 2,425,354 | 8/1947 | Stenzel | 204/190 |
| 3,167,402 | 1/1965 | Samuelson et al. | 423/8 |
| 3,951,771 | 4/1976 | Burger | 204/190 |
| 4,033,851 | 7/1977 | Oros | 204/302 |
| 4,039,404 | 8/1977 | Richards et al. | 204/106 |

Primary Examiner—Charles N. Hart
Assistant Examiner—David R. Sadowski
Attorney, Agent, or Firm—Bernard, Rothwell & Brown

[57] ABSTRACT

Electrostatic separation of aqueous and particulate matter from a primarily organic impurities phase which forms at the organic/aqueous interface in a liquid-liquid extraction process.

5 Claims, 1 Drawing Figure

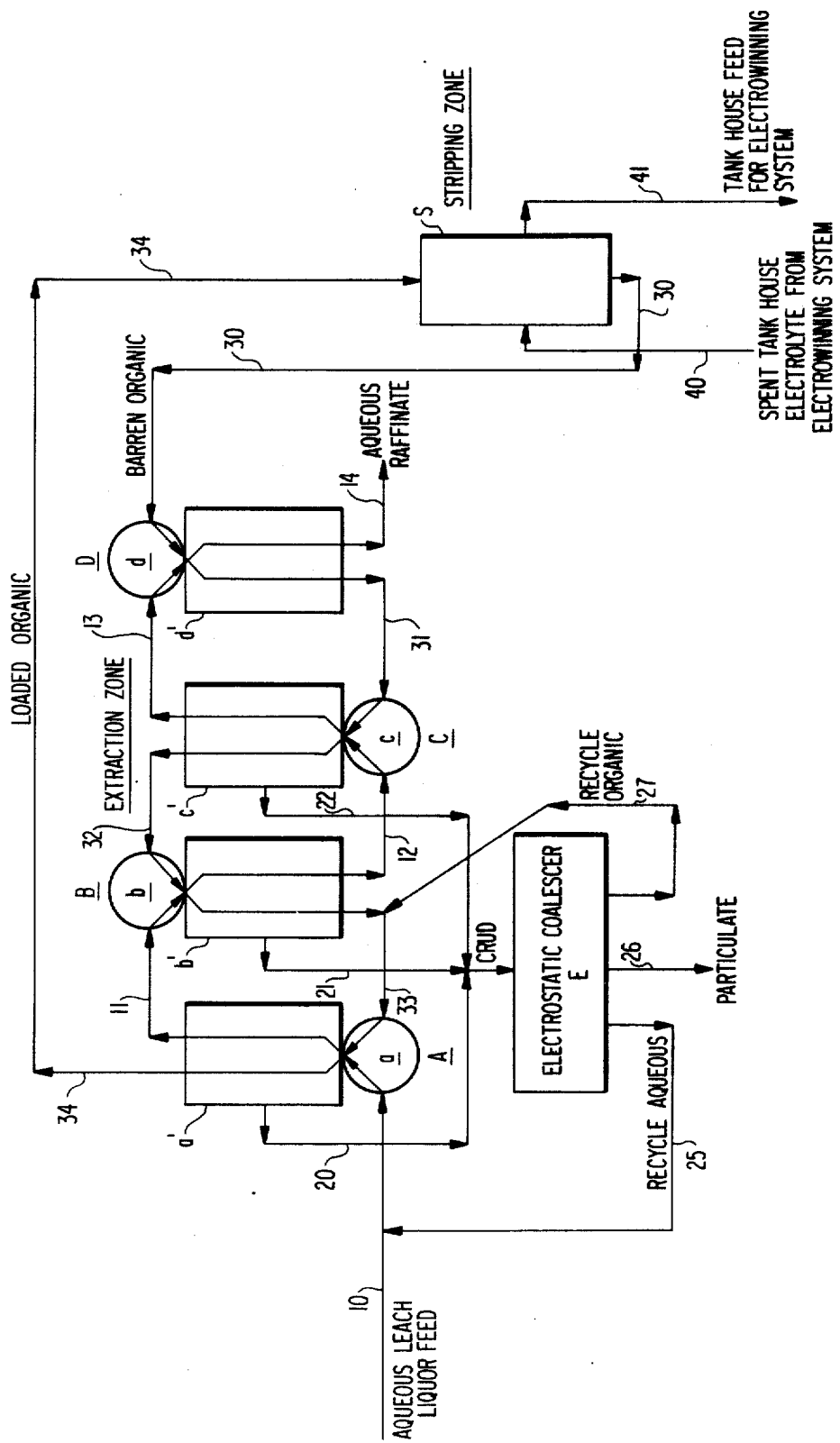

ELECTROSTATIC SEPARATION OF IMPURITIES PHASE FROM LIQUID-LIQUID EXTRACTION

BACKGROUND OF THE INVENTION

The present invention relates to an improved method for removing impurities formed during liquid-liquid extraction operations in hydrometallurgical processing. Such impurities collect in the settling tank used to separate organic and aqueous phases after extraction has occurred.

Liquid-liquid extraction is commonly employed to recover and concentrate metal values from aqueous leach liquors that have been used to dissolve such metal values from their ores. In such a procedure, an aqueous leach liquor containing metal values in ionic form is thoroughly admixed in a mixing device or extraction column with an organic solvent containing an ion exchange or metal complexing agent. In admixture with the metal ion-containing aqueous leach liquor, the organic solvent medium selectively or preferentially dissolves and thereby extracts the metal values from the aqueous leach liquor. After organic solvent extraction of metal values has occurred to the extent desired, the organic/aqueous mixture or dispersion is fed to a settling tank or to the settling region of a mixer-settler wherein the metal-laden organic solvent extract separates by gravity from the metal-depleted aqueous solution. Metal values can be subsequently recovered from the metal-laden organic solvent extract by, for example, conventional electrowinning procedures.

When such an extraction process is conducted in a continuous manner, it is common to have a third phase liquid layer of impurities form between the organic and aqueous phases, i.e., at the organic/aqueous interface in the settling tank or region. Such a third phase impurities layer is colloquially referred to as "crud" in the hydrometallurgical industry. The "crud" layer consists primarily of the organic extraction solvent which contains smaller amounts of aqueous liquid and undissolved particulate material. Such a third phase "crud" layer which forms in the settling tank or region is actually a dispersion, e.g., an emulsion or suspension, of the aqueous and particulate matter in an organic matrix or continuous phase.

During continuous liquid-liquid extraction operations, the third phase layer of impurities accumulates at the organic/aqueous interface. This "crud" accumulation is such that in conventional extraction operations, the settling tank itself must be shut down, dumped and flushed out from time to time in order to prevent the accumulating layer of impurities from eventually interfering with the efficiency of the extraction procedure. Shut down of the settling tank or mixer-settler in the extraction process is, of course, economically disadvantageous, and it is thus an object of the present invention to provide a method for conveniently and economically eliminating the build-up of the third phase "crud" layer of impurities during the organic/aqueous separation procedure in a hydrometallurgical liquid-liquid extraction operation. It has been surprisingly discovered that this "crud" phase can be removed from an extraction settling tank or mixer-settler as it accumulates and broken into its organic, aqueous and particulate components by subjecting it to an electrostatic field.

SUMMARY OF THE INVENTION

In accordance with the present invention, material from the third phase layer of impurities which forms at the organic/aqueous interface during hydrometallurgical extraction operations is removed from the extraction settling tank or region as it accumulates and is separated into its organic, aqueous and particulate components. Such separation takes place by introducing the third phase material into a coalescing zone through which is applied an electrostatic field. The electrostatic field causes the aqueous and particulate materials entrained in the organic portion of the third phase layer to coalesce and separate, thereby forming a new organic phase depleted in aqueous and particulate materials, an aqueous phase depleted in organic and particulate matter and a separated aqueous dispersion of undissolved particulate solids. The purified new organic phase thus formed is returned to the extraction process organic stream. The undissolved solids are removed from the coalescing zone and discarded while the substantially particulate-free aqueous material is returned to the leach liquid stream of the extraction process.

BRIEF DESCRIPTION OF THE DRAWING

The drawing represents a schematic flow diagram of a hydrometallurgical extraction/stripping system. In such a system, organic solvent is used to extract metal values from an organic leach liquor in an extraction zone and is stripped of such metal values by electrowinning electrolyte in a stripping zone. The extraction zone in such a system comprises a series of four mixer-settlers. "Crud" from three of such mixer-settlers is fed to an electrostatic coalescing unit which breaks the "crud" into its organic, aqueous and particulate components.

DETAILED DESCRIPTION OF THE INVENTION

The impurities removal improvement of the present invention can be utilized in various hydrometallurgical processes wherein a third phase impurities layer forms at the organic/aqueous interface in the settling tank following liquid-liquid extraction of metal values from aqueous leach liquors. The aqueous leach liquors employed in such processes can be conventional leaching solutions which have served to dissolve metal values from ores, ore concentrates, mine wastes, scrap metals, etc. For example, metal-containing leach liquors are generated by contacting a metal-containing ore or other source of metal values with an acid solution, for example a solution of dilute, i.e, from about 0.02 N. to 0.4 N., sulfuric acid, or with an ammoniacal solution, for example an ammoniacal solution (from about 0.2 M. to 4.0 M.) of ammonium carbonate. In this manner, pregnant leach liquor solutions are formed containing from about 300 ppm to 20,000 ppm, preferably from about 500 ppm to 3000 ppm, of dissolved metal ions. Metals which can be dissolved include, for example, copper, cadmium, chromium, tin, zinc, uranium, cobalt, nickel and vanadium.

The pregnant leach liquor containing dissolved metal values in ionic form is intimately contacted with an organic liquid extracting medium in a mixing device or column whereby metal values are extracted from the leach liquor by the organic extracting medium. Generally such extracting media comprise an organic solvent containing an organic extracting agent such as an ion exchange or chelating material. The organic extracting agent reacts with metal ions in the aqueous leach liquor to form a metal complex or chelate which is relatively more soluble in the organic solvent of the extracting medium than in the aqueous leach liquor. Metal values in the form of the resulting complex or chelate are thus transferred from the aqueous leach liquor to the organic extracting medium.

Organic solvents which can be used as the organic extracting medium include, for example, hydrocarbons, halogenated hydrocarbons and oxygenated compounds such as alkanols, ketones, ethers, esters and the like. Such solvents may thus be primarily composed of carbon along with a minor weight percentage of hydrogen, with or without a minor amount of one or more elements such as oxygen, nitrogen, halogen and the like.

The organic extracting agent can be any organic material which reacts with metal ions in the leach liquor to form metal-containing species which are relatively more soluble in the organic solvent than in the aqueous leach liquor. Preferably, such materials will be those which selectively or preferentially react with one particular type of metal ion so that leach liquors containing several metal species can be treated to separate the desired metal therefrom. Suitable organic extracting agents include, for example, organic phosphoric acids, carboxylic acids, diketones, amines, hydroxy-oximes such as 2-hydroxy benzophenone oxime, and the like. Typical of such commercially-available extracting agents are the LIX liquid ion exchange products marketed by General Mills.

In the mixing vessel or extraction column, the aqueous leach liquor and organic extracting medium are intimately contacted with each other by, for example, an agitating device, which serves to form a dispersion comprising an aqueous phase which is rich in dissolved metal values and an organic phase which is depleted in dissolved species containing the metal values to be recovered. As a result of the formation of this dispersion, metal-containing species are transferred from the aqueous to the organic phase. After the liquid-liquid extraction operation has been completed in the mixing vessel or extraction column, the resulting aqueous/organic solvent dispersion is transferred to a settling tank or to the settling region of a mixer-settler if a single vessel is employed.

In the settling tank or region the aqueous/organic solvent dispersion separates by gravity into an organic extract layer and an aqueous layer. It is during such gravity settling operations that the third phase layer of impurities generally is formed. This third phase or "crud" forms at the organic/aqueous interface or weir in the settling tank or region. The third phase is thus generally between the overlying organic solvent rich phase and the underlying aqueous phase.

The "crud" layer is best characterized as a dispersion, e.g., an emulsion or suspension, of small or minor amounts of aqueous solution and undissolved particulate matter in a major amount of the organic extraction solvent. Generally the "crud" phase comprises from about 80 parts to 96 parts by weight of the organic extraction solvent, from about 2 parts to 20 parts by weight of the aqueous leach liquor and from about 2 parts to 10 parts by weight of undissolved particulate material present as silicious residue from the ore or other solid material which provides the source of the metal values in the process. The particulate fraction of the "crud" also generally contains reaction product of the leach liquor on the host rock, e.g., gypsum, limestone, etc., and can contain organic matter as well. Often "crud" will comprise from about 90 parts to 95 parts by weight organic, about 5 parts to 10 parts by weight aqueous and about 2 parts to 4 parts by weight particulate.

In accordance with the present invention, material from the third phase "crud" layer is removed from the extraction settling tank or settling region of the mixer-settler as it accumulates and is separated into its organic, aqueous and particulate components by subjecting it to an electrostatic field. Removal of the "crud" from the mixer-settler can be carried out in any convenient manner. For example, a slotted pipe can be positioned in the settling tank with a horizontal slot at the organic/aqueous interface where the third phase impurities layer forms. "Crud" can then be withdrawn from the settling tank through the slotted pipe. Alternatively, a floating pump can be used in the settling tank with the pump intake positioned at the organic/aqueous interface to withdraw "crud" as it forms. "Crud" removed from the settling tank(s) is transferred to an electrostatic coalescing zone for breakdown into its components.

Breakdown of the impurities layer material generally takes place in an electrostatic coalescing apparatus which provides a chamber or zone into which the "crud" material is introduced and through which an electrostatic field is maintained. The electrostatic coalescing apparatus can comprise any suitable device which serves to impress a voltage gradient across a coalescence zone which is sufficient to cause the desired separation of the "crud" material. Advantageously, the voltage gradient in the electrostatic coalescence zone is at least about 1 kilovolt per centimeter. The voltage gradient may be as high as about 10 kilovolts per centimeter or more. Usually, voltage gradients on the order of about 1 to 3 kilovolts per centimeter suffice. Conveniently, the electrostatic field is provided by imposing a high A.C. voltage across the coalescing zone. However, a high D.C. voltage can be used if desired.

The voltage gradient is impressed across the coalescence zone in a manner which permits essentially no flow of electric current through the coalescence zone. Generally, therefore, the voltage gradient is established by two electrodes or sets of electrodes which are electrically insulated to the extent necessary to prevent flow of current through the impurities material present in the coalesence zone. One suitable form of apparatus which can be used to establish the coalescence zone and voltage gradient comprises a pair of substantially horizontal parallel plate electrodes. Of this pair of electrodes, one is normally connected to ground and will generally be positioned as the lower electrode. The shell of the coalescer is also generally grounded if it is constructed of metal. The other non-grounded, high voltage electrode of the pair will generally be positioned as the upper electrode in such an arrangement.

Another suitable form of electrostatic coalescing apparatus comprises a vertically positioned tube with an axial high voltage A.C. or D.C. electrode and with a grounded electrode electrically insulated from the impurities material being treated in the tubes. If the tube itself is made of non-conductive material, e.g., glass, the grounded electrode can comprise a wire wound helically around the tube or a conductive layer or sheet wrapped around the tube.

Devices of these types as well as other suitable conventional electrostatic coalescing devices are described, for example, in Richards et al., U.S. Pat. No. 4,039,404, issued Aug. 2, 1977; Oros, U.S. Pat. No. 4,033,851, issued July 5, 1977; King, U.S. Pat. No. 3,972,800, issued Aug. 3, 1976; Samuelson et al., U.S. Pat. No. 3,089,750, issued May 14, 1963; and Waterman, "Electrical Coalescers," *Chemical Engineering Progress*, Vol. 61, No. 10, Oct. 1965, pp. 51–57. These patents and article are incorporated herein by reference.

Feed rates of impurities material to the electrostatic coalescer and rates of separation of the aqueous and particulate matter from the organic matrix in the coalescing zone depend on a number of factors. Such factors include, for example, the size and capacity of the apparatus involved, the rate of "crud" formation in the extraction settling tank, the strength of the electrostatic field employed in the coalescence zone and the particular make-up of the "crud" layer being treated.

Flow rates to and from the electrostatic coalescer, as well as separation rates in the coalescer, can be adjusted as required by varying the efficiency of the electrostatic coalescer or by varying the composition of the product being fed to the coalescing zone. Adjustments of this type might involve, for example, appropriate variation in the coalescer voltage or recycle of either the organic or aqueous components back to the coalescing zone. It might also be desirable to include a small amount of aqueous solution from the extraction settler with the impurities layer fed to the coalescing zone.

The organic phase separated from the impurities layer in the electrostatic coalescer can be returned to the organic process stream in the extraction system. The aqueous phase separated from the "crud" in the coalescer can be returned to the aqueous leach liquor being fed to the extraction settler. The particulate materials which builds up at the organic/aqueous interface in the electrostatic unit can be removed from the coalescing zone by a separate draw-off pipe and discarded. Generally such particulate material is withdrawn from the coalescer in the form of an aqueous slurry containing from about 60 percent to 95 percent by weight solids.

The present invention can be further illustrated with reference to the drawing. Aqueous leach liquor containing dissolved metal values, e.g., copper sulfate, is fed via line 10 to an extraction zone wherein metal values are extracted therefrom by a barren organic extraction medium, e.g., LIX64N in kerosine, fed to the extraction zone via line 30. The extraction zone comprises four mixer-settlers, A, B, C, and D arranged in series. Each such mixer-settler consists of a mixer, e.g., a, b, c, and d, and a settling tank, e.g., a', b', c', and d'. The aqueous stream, fed to the mixer a of mixer-settler A via line 10, flows through mixer-settlers B, C, and D via lines 11, 12 and 13, leaving mixer-settler D as a aqueous raffinate via line 14. The organic stream, fed to the mixer d of mixer-settler D via line 30 flows through mixer-settlers C, B, and A, in countercurrent relationship to the aqueous stream, via lines 31, 32, and 33, leaving mixer-settler A as metal-laden organic via line 34. Aqueous and organic enter each settling tank as a dispersion formed in the mixer associated with each such settling tank. In each settling tank, aqueous and organic separate into layers and are removed from the tank as separate streams. Both aqueous and organic streams can be recycled through the extraction zone by recycle systems not shown.

Metal laden organic is conveyed via line 34 to a stripping zone S wherein metal values are stripped from the organic by an electrolyte fed to the stripping zone via line 40 from an electrowinning tank house. In the stripping zone, which generally comprises a plurality of stripping mixer-settlers (not shown), metal values are transferred to the electrolyte solution, which solution leaves the stripping zone via line 41 serving as tank house feed for the metal electrowinning system. Barren organic leaves the stripping zone via line 30 where it is recycled to the extraction zone.

"Crud," which forms at the aqueous/organic interface in settling tanks a', b', and c' is removed as it accumulates via lines 20, 21 and 22 and fed to an electrostatic coalescer E. In the coalescer, "crud" is broken into its aqueous, particulate and organic components. The aqueous material so separated can be recycled via line 25 to the aqueous leach liquor feedstream. The particulate material is removed from the coalescer via line 26 and is discarded. The organic material recovered from "crud" in the coalescer can be recycled via line 27 to the organic stream at the first extraction mixer-settler.

The improved impurities removal and separation process of the present invention is also further illustrated by the following example. Such an example is in no way limiting of the invention disclosed and claimed herein.

EXAMPLE

A typical process embodiment of the present invention involves continuous removal of third phase "crud" from a copper ore liquid-liquid extraction process. Using a high flash point kerosine solvent and a hydroxy oxime ion exchange agent (LIX64N marketed by General Mills), copper values are continuously extracted from an aqueous sulfuric acid leach liquor solution containing about 2500 ppm cupric ions as copper sulfate. During the extraction operation, a layer of third phase, "crud" forms at the organic/aqueous interface in the solvent extraction settling tank.

The "crud" layer is removed from the settler at the organic weir and continuously fed to an electrostatic coalescer along with a small amount of aqueous solution from the settler. "Crud" and aqueous solution are sampled and analyzed. The "crud" material consists primarily of kerosine solvent but contains about 6 percent by weight aqueous solution and undissolved particulate solids as residue from the copper ore. The aqueous solution contains about 100 ppm cupric ions and is essentially free of organic material.

"Crud" material is fed to the electrostatic unit at the rate of about 72 liters per hour and aqueous solution is fed at the rate of 8 liters per hour. In the electrostatic coalescer an alternating current voltage gradient of about 1000 volts/cm is impressed across the electrodes therein. Organic material is removed from the electrostatic unit at the rate of about 72 liters per hour and contains approximately 15 ppm aqueous solution and is essentially free of solids. Aqueous product is withdrawn from the electrostatic unit at the rate of about 6 liters per hour and contains essentially no organic material and less than 1 percent solids.

Solids collect at the aqueous/organic interface in the electrostatic unit forming a new "crud" phase. Such "crud" from the electrostatic unit is continuously removed as an aqueous slurry containing about 70 percent by weight solids. Such a slurry is drawn off at the rate of about 2 liters per hour and is discarded.

What is claimed is:

1. In a liquid-liquid extraction process wherein metal values are recovered from an aqueous metal-containing leach liquor by treating said liquor with an organic extracting medium comprising an organic solvent containing an organic extracting agent and wherein during the separation of the organic extracting medium phase from the aqueous solution phase in a separation vessel used in such a process, a third phase dispersion layer of impurities is formed containing a major amount of organic solvent and minor amounts of aqueous solution and undissolved particulate matter, the improvement which comprises:

(a) removing said third phase layer from the organic extract and aqueous phases in said separation vessel;

(b) feeding said removed third phase layer to a coalescing zone through which an electrostatic field is applied so as to cause the aqueous solution and particulate matter entrained in the organic solvent of the third phase layer to coalesce and separate and thereby directly form in said coalescing zone an organic phase depleted in aqueous and particulate matter suitable for return to the organic extracting medium of the extraction process, an aqueous phase depleted in organic and particulate matter suitable for return to the leach liquor of the extraction process, and a separate aqueous material containing undissolved particulate matter;

(c) separating the formed organic phase, aqueous phase and aqueous material containing undissolved particulate matter;

(d) returning said separated organic phase to the extraction process; and (e) returning said separated aqueous phase to the extraction process.

2. A method in accordance with claim 1, wherein the third phase layer comprises from about 80 percent to 96 percent by weight organic material, from about 2 to 20 percent by weight aqueous material and from about 2 to 10 percent undissolved particulate materials.

3. A method in accordance with claim 2 wherein the organic material is a hydrocarbon extraction solvent and the aqueous material is derived from an acidic or ammoniacal leach liquor.

4. A method in accordance with claim 3 wherein the electrostatic field in said coalescing zone is realized by impressing a voltage gradient of at least about one kilovolt per centimeter through said coalescing zone.

5. A method in accordance with claim 4 wherein the voltage gradient is provided by an alternating current voltage source.

* * * * *